INVENTOR
Donald AINSWORTH
and Trevor BLEWETT
BY Abraham A. Saffitz

United States Patent Office 3,536,300
Patented Oct. 27, 1970

3,536,300
APPARATUS FOR CONTINUOUSLY MIXING POWDERS AND OILS TO MAKE PUTTY
Donald Ainsworth and Trevor Blewett, Morley, England, assignors to Vallance & Co. (Morley) Limited, Morley, England
Filed July 8, 1968, Ser. No. 743,209
Claims priority, application Great Britain, July 26, 1967, 34,227/67
Int. Cl. B01f 7/08
U.S. Cl. 259—9               3 Claims

ABSTRACT OF THE DISCLOSURE

Apparatus for continuously mixing powdered and fluid constituents, particularly powders and oils for producing putty, wherein the constituents are fed continuously in measured proportions to a preliminary mixing trough in which a rotary screw device agitates and mixes the constituents and conveys them along the trough into an extrusion cylinder in which a second rotary screw device further agitates the mixture and forces it through a plurality of restricted openings in one or more extrusion plates arranged transversely of the cylinder and thence through a delivery outlet as a continuous flow, said second rotary screw device preferably cooperating with one or more of said extrusion plates to exert a shearing action on the mixture.

---

This invention relates to the mixing of powdered and liquid constituents of putty.

The usual mixing method now used for putty is to place a batch of powder and oil in a circular milling trough and to gradually force the oil into close admixture with the powder by means of a heavy rotary edge runner. This process takes up to half an hour to mix one batch which is then removed manually and replaced by fresh material. It is an object of the present invention to provide for continuous production of mixtures of powdered and liquid constituents in the manufacture of putty and to reduce considerably the production time for any given quantity.

The invention provides a method of mixing comprising the steps of mechanically agitating together measured quantities of the powdered and fluid constituents whilst being conveyed in a continuous stream to produce a pre-mixture, and then continuously forcing this pre-mixture through a plurality of extrusion openings and delivering the final mixture continuously. In accordance with the invention the mix is subjected to a transverse shearing action to the extrusion operation. The invention also provides an apparatus for carrying out this method, comprising means for continuously feeding measured quantities of the constituents to a pre-mixture trough or tube, rotary agitator means in said trough or tube for continuously mixing the constituents during their travel therethrough, means for transferring the stream of mixture to an extrusion cylinder or the like having a plurality of extrusion openings, screw means in said cylinder for conveying the mixture therealong continuously and for continuously applying the extrusion pressure to the extrusion outlet, and delivery means for delivering the mixture continuously from said cylinder.

In order that the present invention may be fully and clearly understood the same will now be described with reference to the accompanying drawings which illustrate by way of example one construction of apparatus for carrying out the invention to provide for the continuous production of putty.

In these drawings:
FIG. 1 represents an elevation of the apparatus;

FIG. 2 illustrates by fragmentary longitudinal sections the construction of two screw-like devices for mixing and extruding the ingredients;
FIGS. 3, 5 and 7 are fragmentary longitudinal sections through the extrusion cylinder and its screw means showing three modifications; and
FIGS. 4, 6 and 8 are sections taken respectively on the lines IV—IV, VI—VI and VIII—VIII in FIGS. 3, 5 and 7.

As shown in FIG. 1 powdered whiting is fed from a hopper 1 through a rotary measuring feeder 2 into one end of a horizontal trough 3. This trough has a curved bottom and a removable top cover 4 for inspection and cleaning purposes. Extending through this trough is a rotatable mixer shaft 5 around which are secured in a spiral path a series of mixer arms 6 which are so shaped and angled as to co-operate also with the trough bottom to act as a screw conveyor.

Linseed oil from a tank 7 is pumped through pipes 8, 9 by a reciprocating pump 10 into the feed end of trough 3 at a predetermined measured rate. If desired pigments may be gravity fed through a pipe or pipes 35 into trough 3.

The mixer arms 6 agitate and pre-mix the whiting and oil, the broken form of this screw helping to prevent the mix from jamming in the trough. At the same time the arms convey the mixture to the delivery end of the trough where it is pushed through a bottom outlet 11 and transfer duct 12 into the feed end of a horizontal extrusion cylinder 13 which conveniently extends below and parallel to the trough.

Extending through this cylinder is a rotatable extruder shaft 14 on which is secured a broken screw forming a series of angled paddles 15A, 15B, 15C which work close to the wall of the cylinder. Spanning the cylinder are two axially spaced apart multi-orificed extrusion plates 16, 17 having a plurality of small holes or orifices which may be, for example, 5 mms. diameter in plate 16 and 8 mms. diameter in plate 17. The diameter of the holes in extrusion plate 16 is smaller than that of the holes in extrusion plate 17, the smaller holes building up the extrusion pressure in the first portion of the cylinder and the larger holes assuring the continuous flow of pressurized powdered and liquid constituents without creating an undesirable reduction in the particle size of the powdered ingredients. The shaft 14 passes through these and is journalled in a bearing 18 in a spider support 19 and its outer end carries an archimedian delivery screw 20 which works in a reduced diameter extension 13X of the cylinder 13 having a delivery outlet 21.

The paddles 15A are arranged to form a broken screw so as to give a further agitating action and also to force the mixture through the apertures in plate 16 but without risk of the screw jamming. The last paddle 15A may work so close to the plate 16 as to exert a shearing action on the mixture to further the mixing operation, and the paddle 15B may operate similarly.

In FIG. 2 there is shown a pressure cone 31 secured on the shaft 14. This acts to compress the mixture as it approaches the openings in the spider support 19 and also protects the bearing 18 from the longitudinal extrusion pressure.

The extrusion cylinder 13, instead of having a smooth cylindrical inner wall, is provided with flutes, channels or ribs extending paraxially or helically so as to cooperate with some at least of the paddles to promote the movement of the mixture along the cylinder and to prevent the mix from binding around the shaft 14 and merely rotating without feeding along, also to exert a high pressure on the mixture and effect a shearing action thereon. Examples of such arrangements are illustrated in FIGS. 3 to 8.

Figure 1:
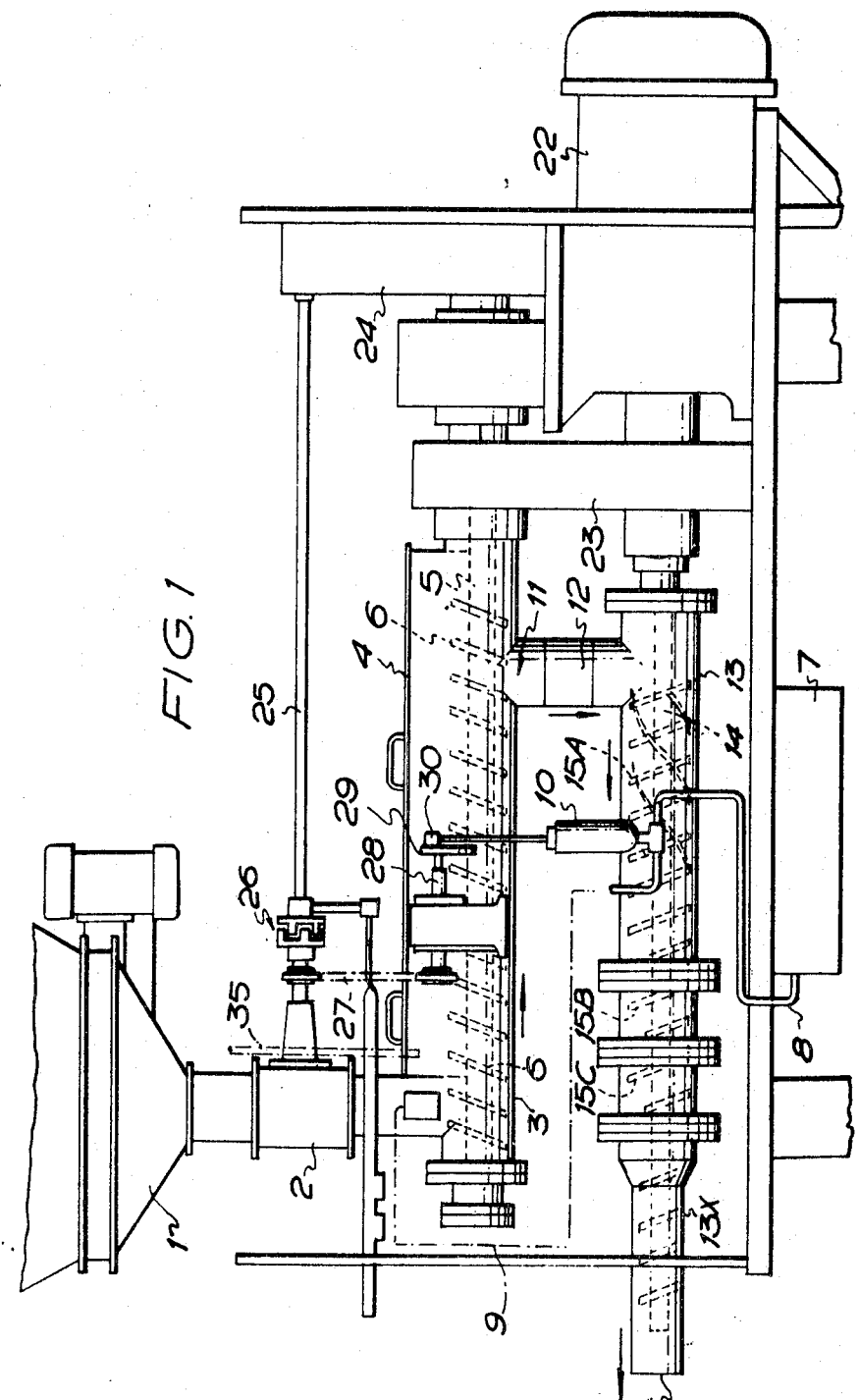
Figure 2:
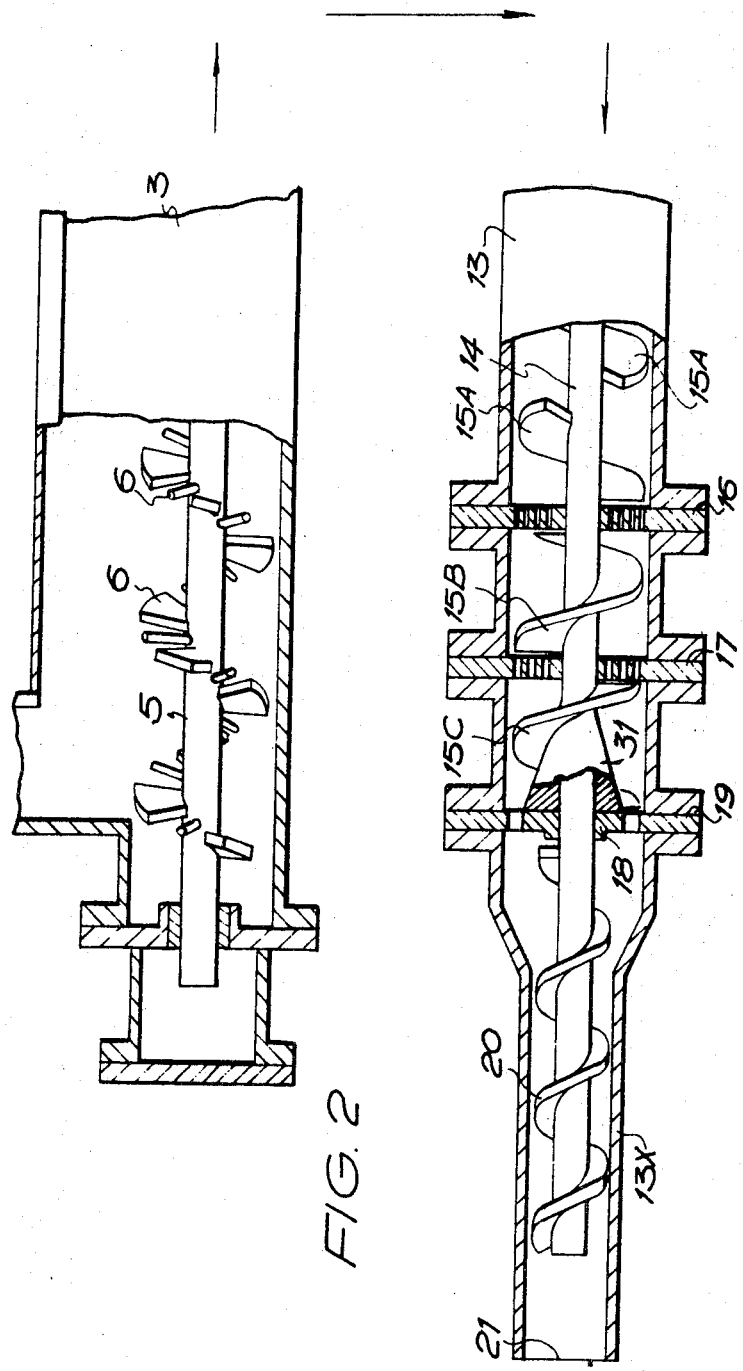
Figure 3:
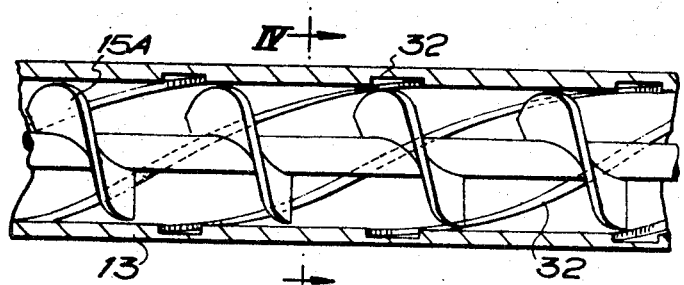
FIGS. 3 and 4 show multiple flutes 32 extending helically in the opposite sense to that of the paddles.
Figure 4:
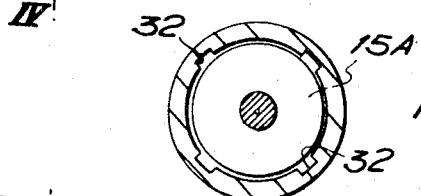
Figure 5:
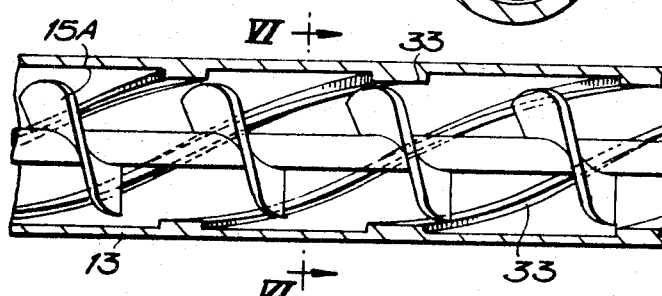
FIGS. 5 and 6 show ribs 33 also extending helically in the opposite sense to that of the paddles.
Figure 6:
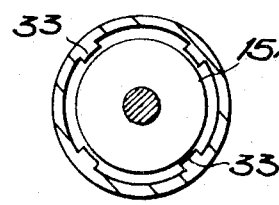
Figure 7:
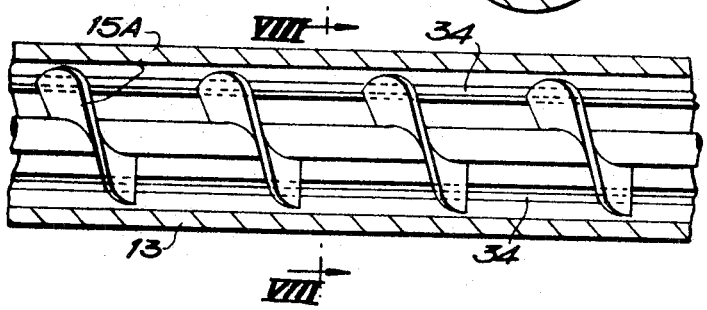
FIGS. 7 and 8 show flutes 34 parallel to the cylinder axis.
Figure 8:
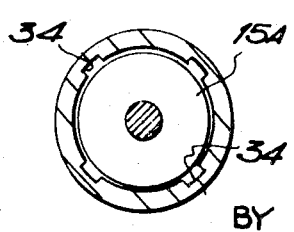

The two shafts 5, 14 are rotated at the same speed through any suitable driving mechanism. In FIG. 1 there is indicated a motor 22 driving the two shafts through transmission gearing in a housing 23. An auxiliary transmission device in a housing 24 transmits a drive through shaft 25 and clutch 26 to the measuring feeder 2 and also through a chain and sprocket connection 27 to the shaft 28 of a crank disc 29 whose crank arm 30 operates the pump 10.

By the above described construction of apparatus the ingredients are pre-mixed by a thorough agitating and mixing action in trough 3 and the mixture is transferred to the cylinder 13 where the mixture is further agitated and mixed, sheared and forced through the plate apertures and forced from the delivery outlet 21 as a continuous flow of compacted putty, the path of the mixture being indicated by the arrows in the drawings. This continuous production can proceed so long as the supply of whiting and oil is maintained, and the time of production is greatly reduced due to the efficient mixing and power extrusion actions.

Whilst the mixing trough and the extrusion cylinder have been described as arranged one below the other to economise in floor space, it will be clear that they might be arranged in line or in any other desired relationship which will enable the continuous production method of this invention to be carried out.

We claim:

1. Apparatus for continuously mixing powdered and liquid constituents of putty and delivering the putty in the form of a stream thereof, comprising in combination:
    an elongated, substantially horizontal pre-mixing chamber having a curved bottom;
    means for continuously feeding measured quantities of the constituents at a controlled rate to a feeding end of said pre-mixing chamber;
    a first continuously driven rotary screw means extending longitudinally in said pre-mixing chamber and including a shaft having mixer arms secured therearound in a helical pattern to cooperate with said curved bottom for agitating and mixing said constituents and simultaneously conveying them through said pre-mixing chamber to form a mixture in a stream;
    an elongated extrusion chamber near the outlet of said pre-mixing chamber;
    means for continually transferring the stream of the mixture from said pre-mixing chamber to said extrusion chamber;
    a plurality of multi-orificed plates spaced transversely along said extrusion chamber, the orifices increasing in size in each successive plate in the direction of travel of the mixture;
    longitudinally extending projections and recesses on the inner wall of said extrusion chamber;
    a second continuously driven rotary screw means in said extrusion chamber including a shaft which extends longitudinally through said extrusion chamber and through said multi-orificed plates, and which has secured helically therearound angled paddle devices forming a broken screw with portions thereof located between adjacent ones of said multi-orificed plates, said second screw means simultaneously further mixing said constituents and cooperating with said projections and recesses so as to exert a shearing action on the mixture and propelling the mixture under the pressure serially through said multi-orificed plates for further intermixing; and,
    outlet means at the end of said extrusion chamber for the continuous delivery therefrom of the thoroughly mixed and compacted putty.

2. Apparatus for continuously mixing powdered and liquid constituents of putty and delivering the putty in the form of a stream thereof, as claimed in claim 1, including a spider support for the shaft of said second screw means located transversely in said extrusion chamber beyond the last of said multi-orificed plates and a cone portion located around said shaft adjacent to said spider support and in advance thereof and diverging in the direction of travel of the mixture for further compressing the mixture as it is forced past said spider support.

3. Apparatus for continuously mixing powdered and liquid constituents of putty and delivering the putty in the form of a stream thereof, as claimed in claim 1, wherein at least one of said angled paddle devices is located sufficiently close behind one of said multi-orificed plates to exert a shearing action on the intermixed constituents as they are forced into the orifices.

References Cited
UNITED STATES PATENTS

| | | | |
|---|---|---|---|
| 420,453 | 2/1890 | Hewes | 259—25 XR |
| 1,522,386 | 1/1925 | Parsons et al. | 259—9 XR |
| 2,016,920 | 10/1935 | Fisher et al. | 259—25 |
| 2,242,364 | 5/1941 | Montanari | 259—9 |
| 2,926,619 | 3/1960 | Kruder | 259—9 XR |
| 3,288,443 | 11/1966 | Lynch et al. | 259—9 |
| 3,323,570 | 6/1967 | Tullock et al. | 259—9 XR |

FOREIGN PATENTS

| | | |
|---|---|---|
| 1,224,533 | 2/1960 | France. |

ROBERT W. JENKINS, Primary Examiner